(12) United States Patent
Delpuch

(10) Patent No.: US 7,996,861 B1
(45) Date of Patent: Aug. 9, 2011

(54) FLEXIBLE INTERFACE FOR SECURE INPUT OF PIN CODE

(75) Inventor: Alain Delpuch, Paris la Defense (FR)

(73) Assignee: Opentv, Inc., San Francisco, CA (US)

( * ) Notice: Subject to any disclaimer, the term of this patent is extended or adjusted under 35 U.S.C. 154(b) by 1467 days.

(21) Appl. No.: 09/980,271

(22) PCT Filed: Jun. 4, 1999

(86) PCT No.: PCT/IB99/01213
§ 371 (c)(1),
(2), (4) Date: Nov. 30, 2001

(87) PCT Pub. No.: WO00/76215
PCT Pub. Date: Dec. 14, 2000

(51) Int. Cl.
*H04N 7/16* (2011.01)
*H04N 7/167* (2011.01)
*H04K 1/00* (2006.01)
*H04L 9/00* (2006.01)
*H04N 5/445* (2006.01)
*H04L 9/32* (2006.01)

(52) U.S. Cl. ............................ 725/30; 713/183; 713/184

(58) Field of Classification Search .................... 725/30; 713/183–184, 202
See application file for complete search history.

(56) References Cited

U.S. PATENT DOCUMENTS

| 4,947,429 | A | | 8/1990 | Bestler et al. |
| 5,267,149 | A | | 11/1993 | Anada et al. |
| 5,530,961 | A | | 6/1996 | Janay et al. |
| 5,550,575 | A | * | 8/1996 | West et al. .................. 725/28 |
| 5,655,077 | A | * | 8/1997 | Jones et al. ................... 726/8 |
| 5,675,647 | A | * | 10/1997 | Garneau et al. .............. 380/239 |
| 5,682,325 | A | | 10/1997 | Lightfoot et al. |
| 5,724,272 | A | | 3/1998 | Mitchell et al. |
| 5,754,173 | A | | 5/1998 | Hiura et al. |
| 5,812,776 | A | * | 9/1998 | Gifford ..................... 709/217 |

(Continued)

FOREIGN PATENT DOCUMENTS

US    EP 0 564 832 A    10/1993

(Continued)

*Primary Examiner* — Christopher Kelley
*Assistant Examiner* — Reuben M Brown
(74) *Attorney, Agent, or Firm* — Rory D. Rankin; Meyertons, Hood, Kivlin, Kowert & Goetzel, P.C.

(57) ABSTRACT

The present invention concerns a system (10) and a process for authenticating a PIN code of a user in an interactive information system in order to run an application. It comprises input means (15) for PIN code entry, security manager means (13) for comparing the PIN code of the user upon a request for user authentication from the application, with a registered PIN code, and giving authorization to run said application if the PIN code of the user matches with the registered PIN code, and display means (17) for displaying any graphics including a PIN entry field. The request for user authentication is provided on the display means via the PIN entry field with the look and feel of said application. The system further comprises emitting means for entering crypted digits, the security manager means (13) being arranged to give authorisation to run the application after full entry of said crypted digits and if the PIN code of the user is identical to the registered PIN code.

11 Claims, 5 Drawing Sheets

U.S. PATENT DOCUMENTS

| | | | |
|---|---|---|---|
| 5,870,723 A | | 2/1999 | Pare, Jr. et al. |
| 5,875,394 A | * | 2/1999 | Daly et al. .................... 455/411 |
| 5,969,748 A | * | 10/1999 | Casement et al. .............. 725/27 |
| 6,067,564 A | * | 5/2000 | Urakoshi et al. .................. 725/2 |
| 6,122,741 A | * | 9/2000 | Patterson et al. ............... 726/17 |
| 6,128,655 A | | 10/2000 | Fields et al. |
| 6,338,138 B1 | * | 1/2002 | Raduchel et al. ............. 713/155 |
| 6,516,465 B1 | * | 2/2003 | Paskins .......................... 725/25 |
| 6,615,353 B1 | * | 9/2003 | Hashiguchi ................... 713/185 |
| 6,628,305 B1 | | 9/2003 | Hong et al. |

FOREIGN PATENT DOCUMENTS

| | | |
|---|---|---|
| WO | WO 98 00968 A | 1/1998 |
| WO | WO 98 37695 A | 8/1998 |
| WO | WO00/76215 A1 | 12/2000 |
| WO | WO 97 19555 A | 12/2000 |

* cited by examiner

FLEXIBLE INTERFACE FOR SECURE INPUT OF PIN CODE

The invention is related to interfaces between man and machine such as computer, telephone or television devices, which need a Personal Identification Number (PIN) to authenticate the user running an application.

By running an application, one should understand to continue or to have access to an application or to specific resources of an application.

The invention is more particularly but not exclusively related to a system and a method used in an interactive information system such as an entertainment system.

Requirements for security in interactive entertainment systems are contradictory.

This is because, in order to run an application, an authentication of the user/viewer is needed while using the specific look and feel of the application.

However, it is also preferred that the PIN code should not be given to the application for security purpose.

In fact, two types of solutions are presently known for authentication. Both present drawbacks, as they are only capable of fulfilling part of the above requirements.

Either the application presents its own user interface for PIN entry, then queries the underlying system to check if the given PIN is correct.

This solution does not hide the PIN code from the application.

Or the application requests the underlying system to authenticate the viewer. For this the underlying system, using its own look and feel, prompts the viewer for its PIN, verifies its validity and then returns the information that the viewer is authorised or not to the application.

This solution is safe, but does not allow integration of the PIN entry with the application look and feel.

In other words and referring to FIG. 1, it is shown a system which presents a good look and feel, but which is not safe, as the PIN code is known by the application.

More precisely, the application 1 has total control of the look and feel.

The viewer provides his PIN code through input means 2 in digital data to the application via an input device, for instance transmitted as infrared signals 3 to the device on which runs the application which displays in 4 the look and feel for the PIN entry field.

Such application, which is now aware of the PIN code, transmits it in 5 to security manager means 6 which, after checking, confirms in 7 authorisation from the system 8.

The PIN code (Input means 2) is therefore provided outside of the system 8, which is unsecured, and may allows third parties to have access to the PIN code.

FIG. 2 displays the other way of functioning of a known system of the prior art.

Here, the application 1 has no control over the look and feel, contrarily to the precedent case.

The application 1 requests in 9 the system 8 to identify the user.

The security manager means 6 uses the input means 2 (PIN Code), provided in 3 and the display screen to create in 4 a display of the PIN entry field.

When the security manager means 6 has checked the PIN code, it gives authorisation (7) to display or to access to resource to the application 1.

On a security point of view this system is good as, at no point, the system 8 gives out the PIN code to the application.

However, the look and feel is here totally under system control, without any consideration for the current application look and feel.

It is therefore a main object of the present invention to provide an improved system and method for authorising a secure way of authentication for an access to an application through a PIN code while using the look and feel of said application during the PIN code interrogation.

It is another object of the invention to provide an improved system and method wherein the safety needed for PIN code entry, is combined with perfect integration of the prompt with the service.

It is another objet of the invention to provide a simple and cost saving flexible interface for secure input of a PIN code.

The problems outlined above are in large part solved by a system for authenticating a PIN code of a user in an interactive information system, in order to run an application which comprises:

input means for PIN code entry, security manager means for comparing the PIN code of the user, upon a request for user authentication from the application, with a registered PIN code, and giving authorisation to run said application if said PIN code of the user matches the registered PIN code, and display means for displaying any graphics including a PIN entry field, characterised in that the request for user authentication being provided on the display means via the PIN entry field with the look and feel of said application, the system further comprises emitting means for entering crypted digits in said PIN entry field upon entering the PIN code of the user in the security manager means through said input means, and the security manager means are arranged to give authorisation to run the application after full entry of said crypted digits and if the PIN code of the user is identical to the registered PIN code.

With such system the PIN code remains hidden from the environment, the user having only the impression to enter physically his PIN code within the PIN entry field of the application. In fact, it remains in the security manager means, which is within the system.

In a preferred embodiment the application is a television program.

The invention also provides a method for authenticating a PIN code of a user in an interactive information system, in order to run an application, wherein said information system emits a request for authenticating a user, said user enters a PIN code through input means, said PIN code of the user is compared with a registered PIN code, within security manager means, and authorisation is provided to run said application if the PIN code of the user matches with the registered PIN code, characterised in that the request for authenticating being provided with a PIN entry field having the look and feel of the is application, crypted digits are entered in said PIN entry field, upon entering the PIN code by the user in the security manager means, and authorisation to display the application is only provided after full entry of said crypted digits, and if the PIN code signal of the user is identical to the registered PIN code as checked by the security manager means.

The invention will be better understood from reading the following description of a particular embodiment given by way of non limiting example, and which refers, additionally to the above mentioned figures showing the prior art, to the accompanying drawings in which:

FIGS. 1 and 2, already mentioned, are schematic drawings figuring the architecture of the PIN code interface of the prior art.

FIG. 3 shows a system 10 arranged to authenticate the user before running an application 11, according to the invention.

Figure 1:
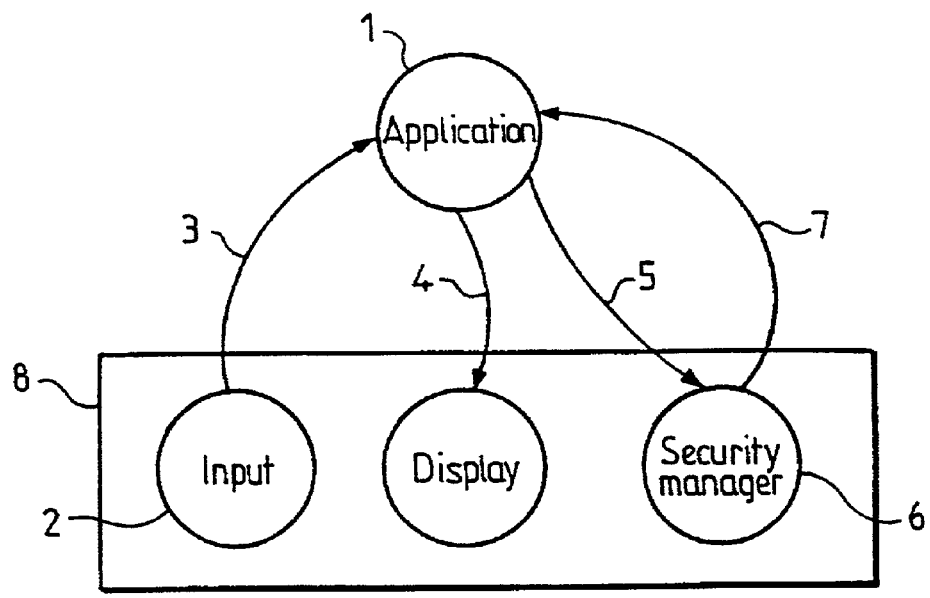
Figure 2:
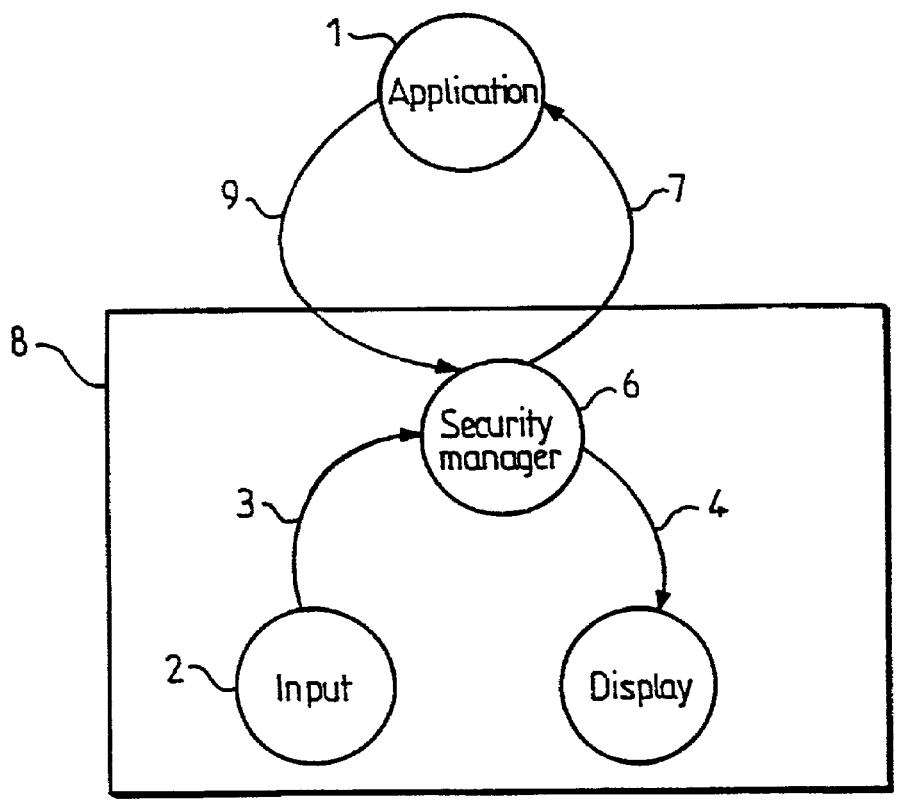
Figure 3:
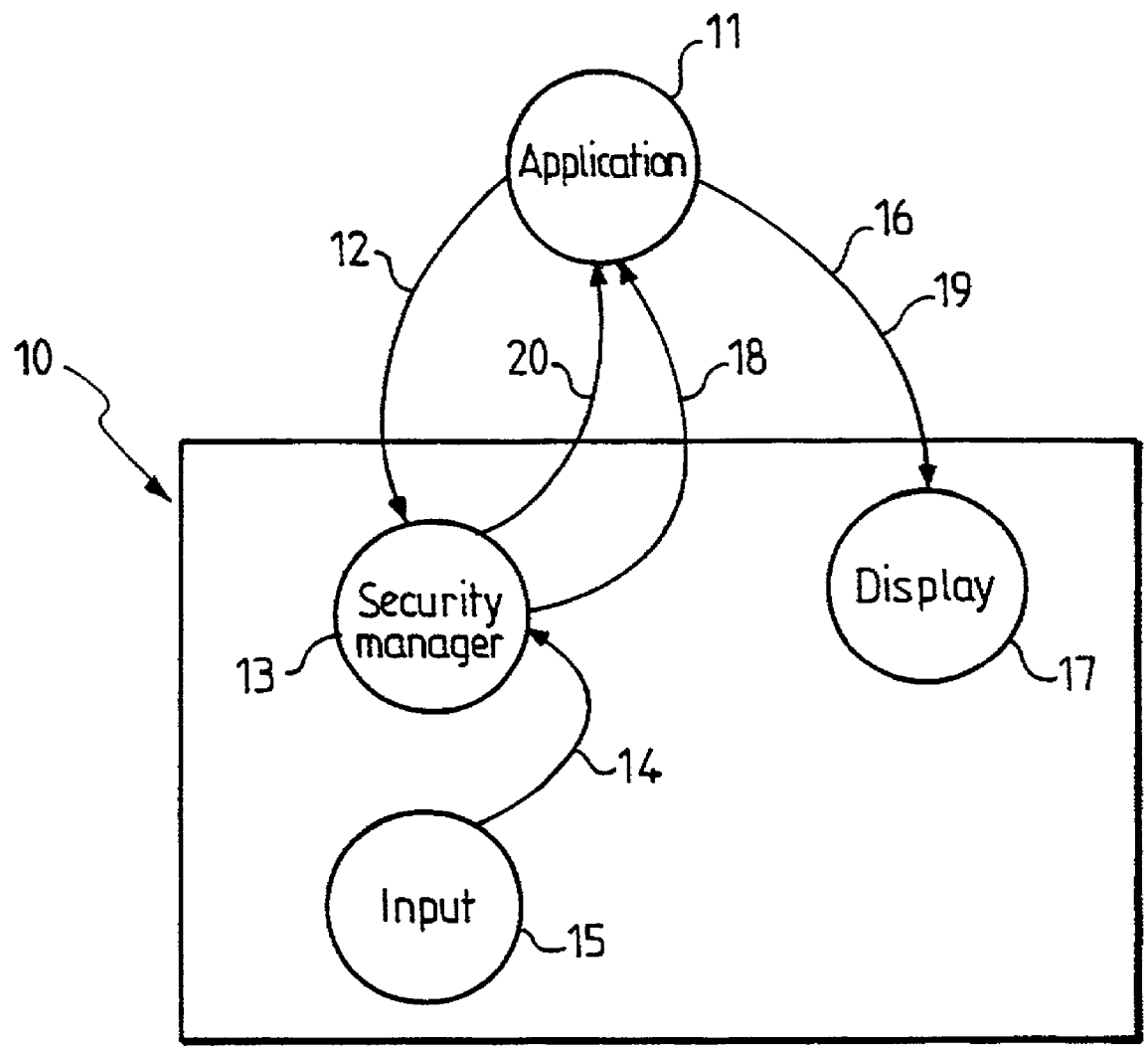
FIG. 3 is a schematic drawing showing the architecture of the system according to the present invention.

The application 11 initiates a PIN entry request 12 to authenticate the user request and simultaneously asks the security manager means 13 to handle key input 14 to be introduced through Input means 15, for instance through a key pad.

The security manager means 13 comprises a small computer system including a central processing unit (CPU), memory and local storage. It is connected to input/output ports.

It is programmed in order to provide the different steps according to the method of the invention.

The application having total control over the graphics displayed and their look and feel, the look and feel 16 for PIN entry is provided on display means 17 according to the application.

The display means can be a TV screen, an LCD screen of a remote portable telephone, etc.

As the security manager means 13 is asked to enter the PIN entry mode, it grabs key inputs 14, analyses these inputs for user authentication and relays in 18 the key presses to the application.

The security manager means does not relay the key values, which therefore remains within the system, but only relays the fact that a key has been pressed, letting for instance the application display an X for each key pressed, in the PIN entry field.

This way the application does not learn about the PIN, but can give user feedback 19 to the display means 17.

When the security manager means 13 recognises the PIN, it informs in 20 the application that the user/viewer has been authenticated.

The application can then run, be displayed and/or operate.

Figure 4:
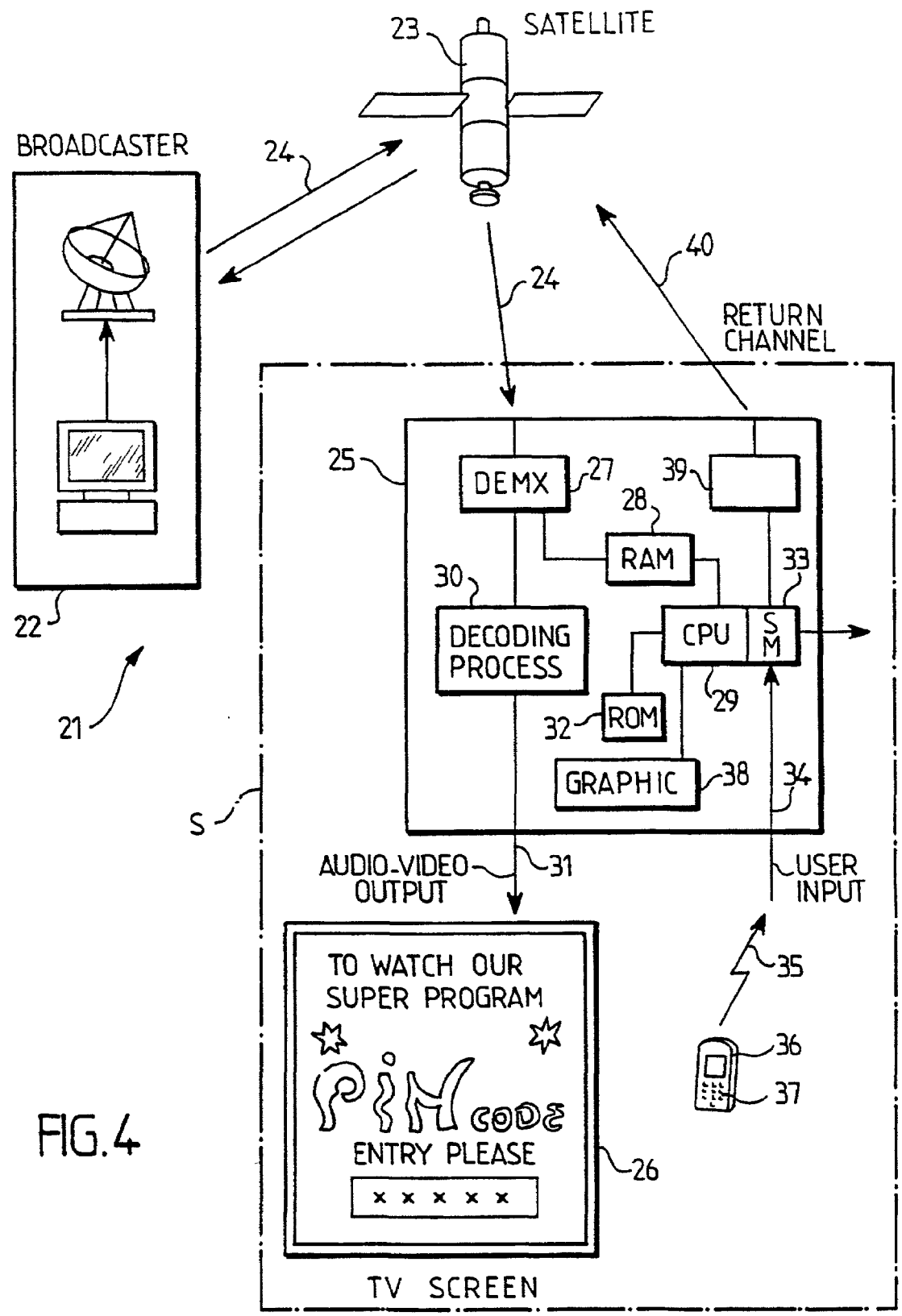
FIG. 4 is a schematic drawing showing an interactive television system for implementing the invention.

FIG. 4 shows schematically an interactive television system 21 including a system S according to the embodiment of the invention more particularly described here.

A broadcaster 22 transmit through a satellite 23 the signal corresponding to the look and feel of an application request (arrows 24), for instance a Pay TV program.

The signal is provided to a digital interactive decoder 25, currently packaged in a set-top connected to a television 26.

It delivers true interactive television using the broadcast-oriented infrastructure currently predominant in the television industry.

The decoder 25 comprises in a manner known per se, a demultiplexer 27 and an application programming interface 28, stored in a local memory (RAM, EPROM FLASH memory, . . . ), such as the one proposed by the applicant OPEN TV, and which provides a library of functions which can display graphics on the television screen, control audio/video services, accept user input and communicate with the outside world.

The decoder 25 also comprises a CPU 29, Audio/Video decoding means 30, connected through audio video output 31 to the television set 26, storage means 32 for storing an operating system for the CPU 29, such as the one provided by OPEN TV.

The CPU 29 further includes part of the security manager means 33 as described in the invention.

The decoder 25 also comprises Input means 34 such as infrared sensors arranged to receive infrared signals 35 emitted by a remote control apparatus 36 having a key pad 37, and display function means 38 controlled by the CPU.

The decoder 25 also comprises output means having a modem and/or a multiplexer 39 for providing back return signals 40 on a return channel to the broadcaster 22 and/or a server.

The broadcast system may be, of course based on satellite or cable or some other medium.

Figure 5:
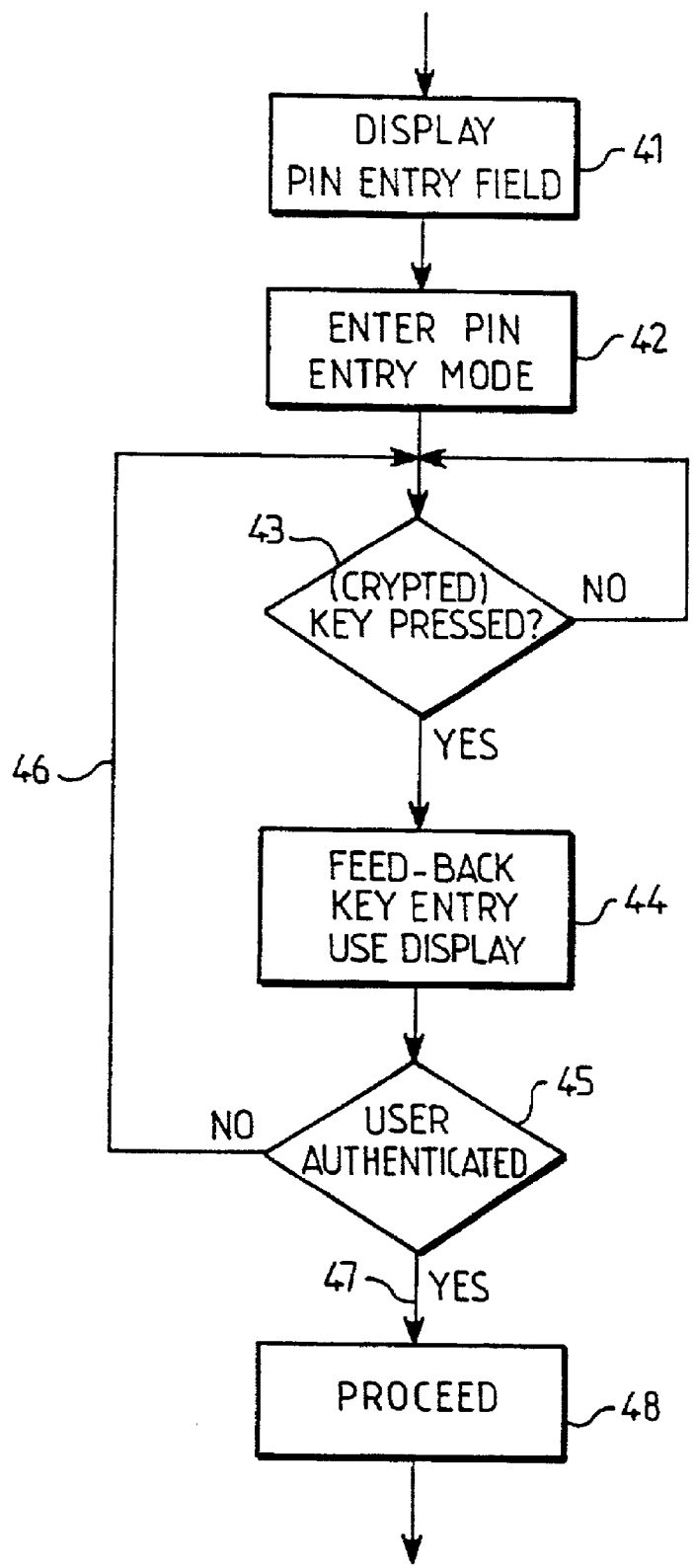
FIG. 5 is a flowchart related to the application according to the embodiment of the invention more particularly described here.

FIG. 5 shows a block diagram according to an embodiment of the invention to be included in an application to authenticate the users to continue or to have access to specific resources which needs authentication by a PIN code.

The application first uses some display function (block 41) to present a PIN entry field to the viewer.

It then asks the security manager means to enter the PIN entry mode and check in 43 if keys are pressed.

As keys are pressed, it gives (block 44) feedback using the display function.

If the user is not authenticated (step 45), it comes back (loop 46) to check 43.

If the user is authenticated (in 47), there is an OK from the security manager means and the application can go on (step 48).

Figure 6:
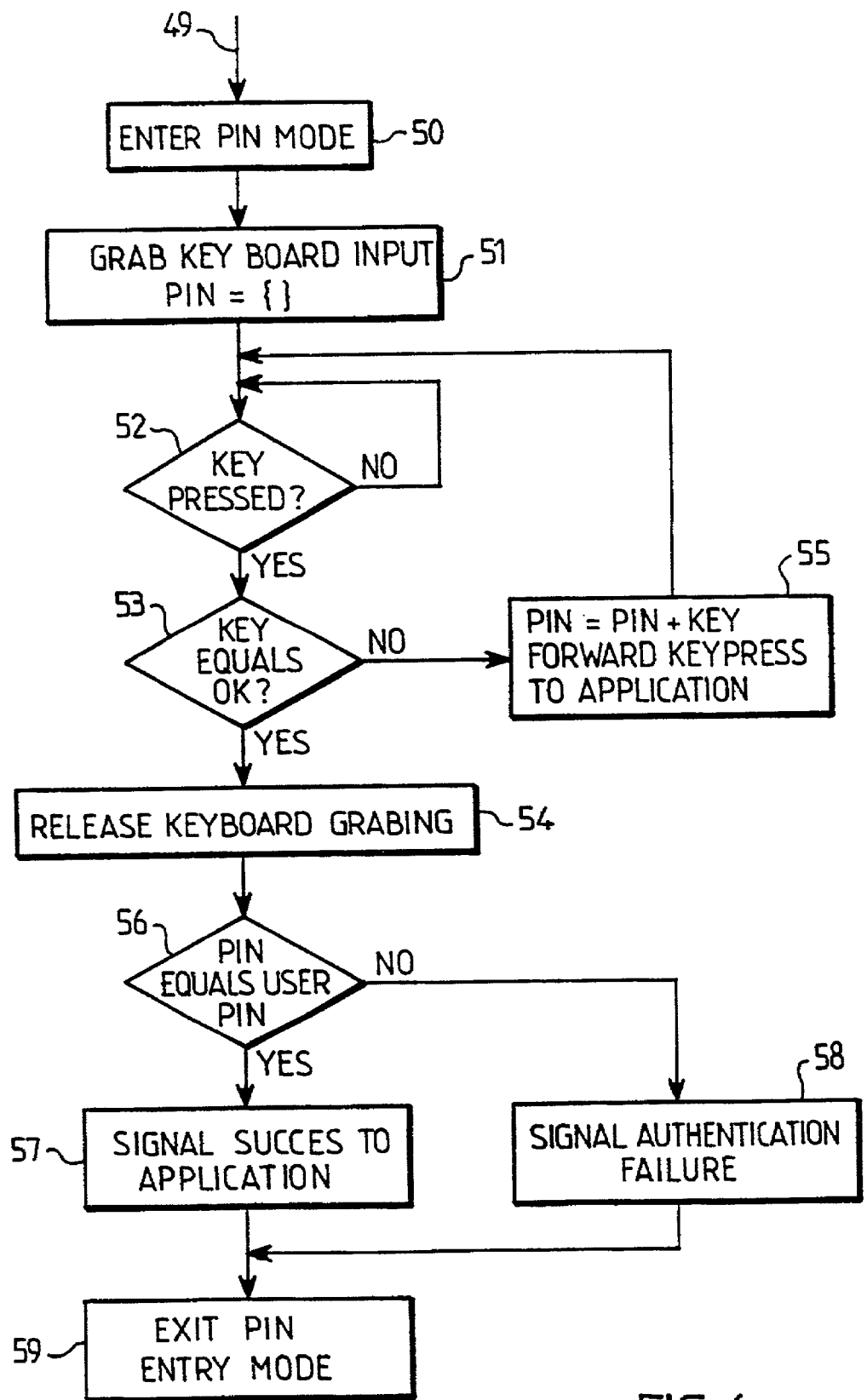
FIG. 6 is a flowchart implemented by the security manager means according to the embodiment of the invention more particularly described here.

An example of a block diagram of the security manager program is provided on FIG. 6 and is performed entirely (and secretly) within the System S.

At the application request in 49, the security manager means enters a PIN entry mode (step 50).

The PIN repertory is then initialised to empty in 51 and the system wait for a key to be pressed (check 52).

If the key is an <<ending>> key (for instance OK or enter), (check 53) there is a release of the key input grabbing (step 54).

If not there is a loop 55 for more key.

After release of the key input grabbing, the security manager means checks in 56 the entered PIN against the user's PIN.

It then either returns success (step 57), or failure (step 58) to application (step 45 of the application), before exiting PIN entry mode in 59.

It will now be described the functioning of the system while referring to FIG. 4.

At the broadcast site, pay TV programs of a Specific Provider are stored.

The pay TV programs are encoded into a digital bitstream which is compressed and multiplexed with the signal of the PIN code field of the Specific Provider, including its logo and a menu to allow the viewer to have access to other movies of the provider, to form a single bitstream.

This single bitstream is then broadcasted to all subscribers. At each customer's site, the bitstream is received by the decoder 25 where the audio and video are decompressed and the PIN code field is sent to the customer's television set 26.

The request for the PIN code of the user is therefore prompted to the viewer.

The viewer then, for instance through a remote control apparatus, can enter his PIN code by pressing keys.

At each pressing, a cross appears in the PIN entry field on the TV Screen.

Meanwhile the Security manager means 33 compares the PIN code with a preregistered user's PIN code entered before in the decoder for instance via a modem.

If the PIN codes matches, signals are sent to the application decoding process 30, and such decoding process is then authorised for displaying the application on the TV set.

Additional advantages and modifications will readily occur to those skilled in the art. Therefore the present invention in its broader aspects is not limited to the specific details, representative devices and illustrated examples shown and described herein.

For instance, it also includes application to PIN code entry for obtaining specific services through mobile phone, for instance via GSM, or other specific services via Television and/or Internet.

The invention claimed is:

1. A system for authenticating a PIN code of a user in an interactive information system in order to run an application, the system comprising:
    an input device for entering a PIN code of a user;
    a security manager configured to:
        receive a request for user authentication from the application;
        compare a received PIN code of the user with a registered PIN code, in response to said request;
        supply information to the application about PIN code entering key-pressing operations by the user, wherein the entered PIN code is not supplied to the application; and
        give authorization to run said application if the PIN code of the user matches the registered PIN code;
    wherein the application is configured to present a PIN entry field, wherein crypted information corresponding to said information about PIN code entering key-pressing operations received from the security manager is displayed in the PIN entry field.

2. A system according to claim 1 wherein the application comprises a television program.

3. A system according to claim 1, wherein the application comprises a service provided on a mobile telephone.

4. A method for authenticating a PIN code of a user in an interactive information system, in order to run an application, the method comprising:
    receiving a request from a user to run the application;
    the application presenting a PIN entry field in response to said request;
    a security manager comprising a processor:
        receiving a request for user authentication from the application;
        supplying information to the application about PIN code entering key-pressing operations by the user, wherein the entered PIN code is not supplied to the application;
        comparing an entered PIN code of the user with a registered PIN code;
        giving authorisation to run said application if the PIN code of the user matches the registered PIN code;
    wherein the application is configured to present in the PIN entry field crypted information corresponding to the information about PIN code entering key-pressing operations received from the security manager.

5. A method according to claim 4, further comprising:
    the application asking the security manager to enter a PIN entry mode;
    checking if keys are pressed by the user;
    responsive to keys being pressed, giving feedback in entering said crypted digits in said PIN entry field; and
        if the user is authenticated by said security manager, giving said authorisation to run the application.

6. A method according to any of claims 4 and 5, wherein the method further comprises
    the security manager initializing to empty a PIN repertory;
    waiting for a key to be pressed by the user;
    upon occurrence of pressing an ending key, checking if a release occurs;
    checking the entered PIN against the user's PIN; and
    if the entered PIN matches the user's PIN, authorising the application to run.

7. A method according to any of claims 4 to 5, wherein the application comprises a television program.

8. A method according to any of claims 4 to 5, wherein the application comprises a service provided on a mobile telephone.

9. A non-transitory computer readable storage medium comprising executable instructions for authenticating a PIN code of a user in order to run an application, wherein the program instructions are operable to:
    receive a request for user authentication from the application;
    supply information to the application about PIN code entering key-pressing operations by the user, wherein the entered PIN code is not supplied to the application; and
    give authorization to run said application if the PIN code of the user matches the registered PIN code;
    wherein the application is configured to present a PIN entry field, wherein crypted information corresponding to said information about PIN code entering key-pressing operations received from the security manager is displayed in the PIN entry field.

10. A non-transitory computer readable storage medium according to claim 9, wherein the application comprises a television program.

11. A non-transitory computer readable storage medium according to claim 9, wherein the application comprises a service provided on a mobile telephone.

* * * * *